Figures 1, 2, 3:
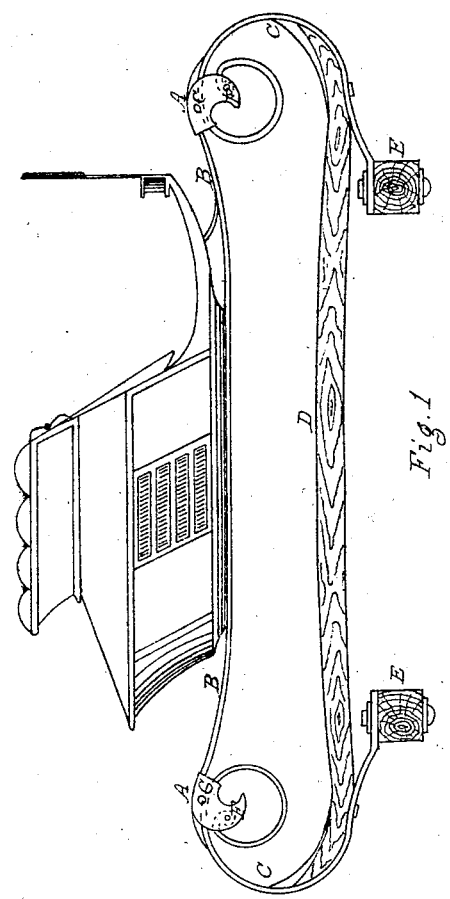

E. C. Brooks.
Spring-Attachment for Vehicles.
No. 73497  Patented Jan. 21, 1868

Witnesses
H. F. Richter
Louis F. Reichert

Inventor,
Eliphalet C. Brooks
By
Joseph H. Atkinson
Attorney

United States Patent Office.

ELIPHALET C. BROOKS, OF SAN FRANCISCO, CALIFORNIA.

Letters Patent No. 73,497, dated January 21, 1868.

IMPROVED SPRING-ATTACHMENT FOR VEHICLES.

The Schedule referred to in these Letters Patent and making part of the same.

TO WHOM THESE PRESENTS SHALL COME:

Be it known that I, ELIPHALET C. BROOKS, of the city and county of San Francisco, State of California, have made a new and useful Improvement in Spring-Attachments for Vehicles, of which the following, together with the accompanying drawings, making a part of this specification, is a full, clear, and concise description. And to enable any one skilled in the art to manufacture the same, I proceed to describe the purposes and action of the same, with reference to figures and letters designating the several parts, and showing the places of their action and uses.

The purposes of my invention are to construct a thorough-brace attachment to a C-spring, forming the C-spring in such a manner that the curve of the spring on the under side shall be brought back close to the under side of the spring, so that a shield or clamp may be secured to the spring by a bolt passing through the turns of the spring. Through this shield is a bolt, to which a thorough-brace is attached, the end being covered by the shield.

The position of this attachment upon the spring makes the spring form the jack for the thorough-brace, giving to the thorough-brace the advantage of the action of the full spring. It will be noticed that the spring-jack is strengthened by the wooden perch that passes over the axle and curves up with the spring, giving it additional strength and an action with the spring, and under the body of the vehicle, assisting in giving an easy motion, desirable for light and easy-riding carriages Figure 1 is a side view.

Figure 2, shield-clamp.

Figure 3, bolts and thorough-brace.

A, shield-clamp; B, thorough-brace; C, spring; D, perch; E, axle; F, bolt fastening shield-clamp to jack; G, bolt fastening thorough-brace to shield or jack.

I claim the combination of the shield A, bolts F and G, with the perch D, axle E, in combination with the spring C and thorough-brace B, substantially as shown for the purposes specified.

ELIPHALET C. BROOKS.

Witnesses:
H. F. RICHTER,
LOUIS F. REICHERT.